United States Patent
Iyer et al.

(10) Patent No.: US 11,805,447 B2
(45) Date of Patent: Oct. 31, 2023

(54) DYNAMIC TRAFFIC CONTROL FOR DOCKING STATION AND INFORMATION HANDLING SYSTEM

(71) Applicant: Dell Products L.P., Round Rock, TX (US)

(72) Inventors: Vivek Viswanathan Iyer, Austin, TX (US); Michael S. Gatson, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 2 days.

(21) Appl. No.: 17/024,184

(22) Filed: Sep. 17, 2020

(65) Prior Publication Data

US 2022/0086690 A1   Mar. 17, 2022

(51) Int. Cl.
  *H04W 28/10*   (2009.01)
  *H04L 47/24*   (2022.01)

(52) U.S. Cl.
  CPC ............. *H04W 28/10* (2013.01); *H04L 47/24* (2013.01)

(58) Field of Classification Search
  CPC ............... G06F 1/1632; G06F 13/4068; G06F 13/4282; G06F 13/4286; G06F 13/0481; G06F 13/385
  See application file for complete search history.

(56) References Cited

U.S. PATENT DOCUMENTS

| 9,429,992 | B1* | 8/2016 | Ashenbrenner | G06F 13/4081 |
| 2010/0077109 | A1* | 3/2010 | Yan | G06F 1/1632 |
| | | | | 710/17 |
| 2012/0155445 | A1* | 6/2012 | Javaregowda | H04L 65/1083 |
| | | | | 370/338 |
| 2018/0300262 | A1* | 10/2018 | Ellis | G06F 13/4282 |
| 2019/0073000 | A1* | 3/2019 | Lee | G06F 1/266 |
| 2020/0311011 | A1* | 10/2020 | Kim | G06F 13/4081 |
| 2020/0326955 | A1* | 10/2020 | Adiletta | G06F 1/1684 |
| 2021/0232527 | A1* | 7/2021 | Sweet, Jr. | G06F 13/4068 |

* cited by examiner

*Primary Examiner* — Khaled M Kassim
*Assistant Examiner* — Najeeb Ansari
(74) *Attorney, Agent, or Firm* — Norton Rose Fulbright US LLP

(57) ABSTRACT

A method for allocating traffic between a wireless interface and a wired interface of an information handling system may begin with determining that the information handling system is connected to a dock via a wireless interface. A determination may also be made that the information handling system is connected to the dock via a wired interface. One or more characteristics of at least a portion of data to be transmitted between the information handling system and the dock may be determined. A first portion of the data to be transmitted may be transmitted via the wireless interface based, at least in part, on the one or more characteristics. A second portion of the data to be transmitted may be transmitted via the wired interface based, at least in part, on the one or more characteristics.

15 Claims, 5 Drawing Sheets

DYNAMIC TRAFFIC CONTROL FOR DOCKING STATION AND INFORMATION HANDLING SYSTEM

FIELD OF THE DISCLOSURE

The present disclosure generally relates to information handling systems, and more particularly relates to allocation of data transmission between an information handling system and a docking station across wireless and wired interfaces.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

Portable information handling systems, such as laptop or notebook computers, may be docked at docking stations, or docks, to allow the information handling system to connect to a variety of peripheral devices and utilities. A user may use a portable information handling system alone while traveling and may install a docking station at a desk or workstation to connect the portable information handling system to a variety of peripheral devices when in use at the desk or work station. For example, docking stations may allow portable information handling systems to connect to a power source, an external network, the internet, one or more displays, keyboards, computer mice, speakers, external hard drives, webcams, microphones, and other devices.

Recent advances in wireless connectivity have allowed portable information handling systems to wirelessly connect to a variety of peripherals and devices. For example, information handling systems may wirelessly connect to power sources to charge batteries and/or receive power for operation via the wireless connection. As another example, information handling systems may wirelessly connect to docking stations, enabling wireless communication with a wide array of peripherals that may be connected to the dock via wired or wireless connections. However, wireless connections between information handling systems and docks may encounter problems such as insufficient bandwidth of the wireless connection to communicate all data to be transmitted between the information handling system and the docking station, latency of data communicated between the information handling system and the docking station, challenges related to power usage and control, channel allocation, and/or interference impacting a quality of the wireless connection between the information handling system and the docking station. Wireless connections between information handling systems may also increase a processing load of the information handling system, requiring additional encoding of information for transmission via the wireless interface. Such problems may negatively impact a user experience.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An information handling system may connect to and communicate with a dock via both a wired connection, such as a USB-C connection, and a wireless connection, such as a Bluetooth connection. For example, an information handling system at a work station may be physically wired to a dock, such as via a USB-C cable, and wirelessly paired with the dock, such as via Bluetooth connection. Use of both wired and wireless connections to transmit data between an information handling system and a dock may allow for increased bandwidth for data transmission between the information handling system and the dock and reduced latency in transmission of data between the information handling system and the dock. Furthermore, data to be transmitted between the information handling system and the dock may be allocated between wireless and wired interfaces to make use of both the wired and wireless interfaces contemporaneously. Characteristics of data to be transmitted between the information handling system and the dock may be analyzed to determine an allocation of data for transmission via the wired and wireless interfaces. For example, data possessing certain characteristics, such as data that would benefit from being transmitted via a low latency connection, may be allocated to be transmitted over the wired interface, while other data may be transmitted via the wireless interface. If data for transmission between the information handling system and the dock exceeds a bandwidth threshold that may be set based on a desired quality of service for a wired or wireless interface, the data may be allocated across both wired and wireless interfaces, rather than a single interface. If transmission of the data via a low latency interface would improve a user experience, such as transmission of mouse and keyboard input for a gaming application, the data may be transmitted via the wireless interface. Alternatively or additionally, if transmission of data would benefit from increased bandwidth, such as transmission of display information from the information handling system to a plurality of displays coupled to the dock, transmission of the data may be split across both the wired and wireless interfaces. Thus, both wired and wireless interfaces between an information handling system and a dock may be used to enhance data transmission between the information handling system and the dock and to improve a user experience.

Data traffic between an information handling system and a dock may be allocated between a wired interface and a wireless interface based on characteristics of the data, such as a latency requirement of the data and/or a bandwidth requirement of the data. Allocation of data between the wired interface and the wireless interface may allow the information handling system and the dock to utilize both the wired and wireless interfaces for simultaneous communication. A method for allocating data traffic between a wireless interface and a wired interface of an information handling system may begin with determining that the information handling system is connected to a dock via a wireless interface. For example, an information handling system may determine that a wireless interface of the information handling system is connected to a wireless interface of the dock, such as via a Bluetooth or Wi-Fi connection. Alternatively or additionally, a dock may determine that a wireless interface of the dock is connected to a wireless interface of the information handling system. For example, an information handling system may detect a wireless connection with a dock via communication with the dock via a wireless interface, and the dock may detect a wireless connection with the information handling system via communication with the information handling system via the wireless interface.

A determination may also be made that the information handling system is connected to the dock via a wired interface. For example, an information handling system may determine that a wired interface of the information handling system is connected to a wired interface of the dock, such as via a universal serial bus type-C (USB-C) connection. The dock may determine that a wired interface of the dock is connected to a wired interface of the information handling system. For example, an information handling system may detect a wired connection with a dock via communication with the dock via a wired interface, and the dock may detect a wired connection with the information handling system via communication with the information handling system via the wired interface. Thus, an information handling system may determine that it is connected to a dock via both wired and wireless interfaces, and/or the dock may determine that it is connected to the information handling system via both wired and wireless interfaces. In some embodiments, a determination may be made that the information handling system is connected to the dock via both the wired interface and the wireless interface at a given time.

A determination may be made of one or more characteristics of at least a portion of data to be transmitted between the information handling system and the dock. Such characteristics may, for example, include a desired latency of transmission of the data, a required bandwidth for transmission of the data, a type or multiple types of data to be transmitted, a round trip latency of the data, and other data characteristics. For example, a service executed by the information handling system and/or the dock may monitor application execution and/or data usage and may determine characteristics of data to be communicated between the information handling system and the dock. The service may determine that a required bandwidth for transmission of data exceeds a predetermined threshold, such as a maximum bandwidth for the wired interface, a maximum bandwidth for the wireless interface, or a bandwidth threshold for the wired or wireless interface set to maintain a predetermined quality of service. Alternatively, the service may determine that the data includes a predetermined type of data, such as keyboard or mouse input data or display data, that would benefit from being transmitted via a low latency connection.

Based on one or more characteristics of the data to be communicated between the information handling system and the dock, a first portion of the data may be transmitted via the wireless interface and a second portion of the data may be transmitted via the wired interface. For example, if transmission of data requires bandwidth that exceeds a bandwidth threshold, such as a maximum bandwidth of a wired interface, the data for transmission may be split between the wired and wireless interfaces to allow for greater transmission bandwidth. As another example, if transmission of data requires low latency, such as keyboard or computer mouse input for gaming applications, a determination may be made to transmit at least some of the data via the wired interface to take advantage of the lower latency of the wired connection. In some embodiments, the information handling system may allocate data traffic to be transmitted to the dock between the wired and wireless interfaces such that a first portion of the data is transmitted via the wireless interface and a second portion of the data is transmitted via the wired interface. Alternatively or additionally, the dock may allocate data traffic to be transmitted to the information handling system between the wired and wireless interfaces such that a first portion of the data is transmitted via the wireless interface and a second portion of the data is transmitted via the wired interface. For example, the information handling system may allocate a first portion of forward channel data, data to be transmitted from the information handling system to the dock, to be transmitted via the wireless interface and a second portion of forward channel data to be transmitted via the wired interface. Alternatively or additionally, the dock may allocate a first portion of back channel data, data to be transmitted from the dock to the information handling system, to be transmitted via the wireless interface and a second portion of back channel data to be transmitted via the wired interface. Thus, the first portion of the data transmitted via the wireless interface may include both forward channel data allocated by the information handling system and back channel data allocated by the dock, and the second portion of the data transmitted via the wired interface may include both forward channel data allocated by the information handling system and back channel data allocated by the dock. In some embodiments, the information handling system may also allocate data traffic to be transmitted by the dock to the information handling system between the wired and wireless interfaces such that a first portion of the data is transmitted via the wireless interface and a second portion of the data is transmitted via the wired interface and may instruct the dock of the allocation. In some embodiments, the dock may also allocate data traffic to be transmitted by the information handling system to the dock between the wired and wireless interfaces such that a first portion of the data is transmitted via the wireless interface and a second portion of the data is transmitted via the wired interface and may instruct the information handling system of the allocation. Thus, transmitting the first portion of the data may include transmitting the first portion of the data from the information handling system to the dock, and transmitting the second portion of the data may include transmitting the second portion of the data from the information handling system to the dock. Alternatively or additionally, transmitting the first portion of the data may include transmitting the first portion of the data from the dock to the information handling system, and transmitting the second portion of the data may include transmitting the second portion of the data from the dock to the information handling system.

As one example, a plurality of displays may be connected to an information handling system via a dock. Data for a first display, or first group of displays, of the plurality of displays may be allocated for transmission via the wireless interface, while data for a second display, or second group of displays, of the plurality of displays may be allocated for transmission via the wired interface.

In some embodiments, the information handling system and/or dock may monitor data and/or applications for changes in characteristics of data to be transmitted. For example, services executed by the information handling system and/or dock may monitor application data usage. A change in one or more characteristics of data to be transmitted between the information handling system and the dock may be detected. For example, the information handling system and/or dock may determine that a bandwidth required for data transmission has increased and exceeded a threshold bandwidth requirement. When a change in data characteristics is detected, an allocation of the data between the wireless interface and the wired interface may be adjusted based on the change in the one or more characteristics of the data to be transmitted. For example, if an amount of data to be transmitted via the wired interface exceeds a threshold, additional data may be allocated for transmission via the wireless interface.

An information handling system may include a wired interface, a wireless interface, and a processor configured to perform the steps described herein. A dock may also include a wired interface, a wireless interface, and a processor configured to perform the steps described herein. Alternatively or additionally, a computer program product may include a non-transitory computer-readable medium comprising instructions to cause a processor to perform the steps described herein.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications and with several different types of architectures.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
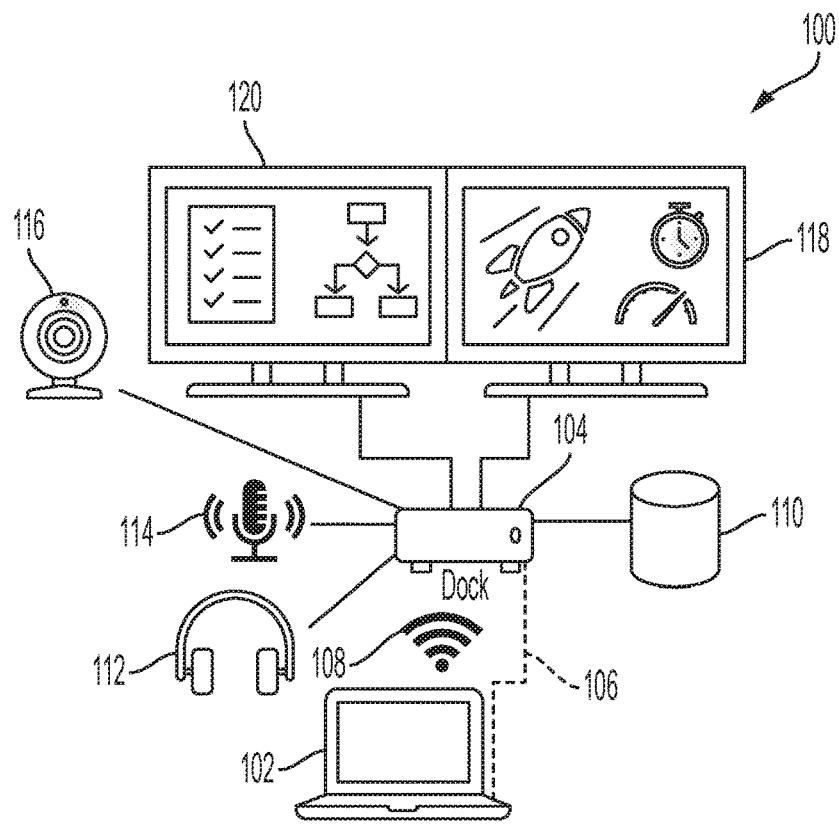
FIG. 1 is an illustration of an information handling system connected to multiple peripheral devices via a dock, according to some embodiments of the disclosure.

Docks may be used to connect portable information handling systems, such as notebook computers, to an array of peripherals. Wireless communications between information handling systems, docks, and or peripheral devices can provide users flexibility, allowing connection of an information handling system to peripheral devices without requiring establishing multiple physical connections between the information handling system and the devices. For example, as shown in the example information handling system layout 100 of FIG. 1, an information handling system 102 may connect to a dock 104 via a wireless connection 108, such as a Bluetooth connection or a Wi-Fi connection. For example, data may be transmitted via the wireless connection using a wireless real-time transport protocol (RTP) over user datagram protocol (UDP) connection, and/or a wireless media-agnostic universal serial bus (MA-USB) over transmission control protocol (TCP) connection. The dock 104 may be connected to a plurality of peripheral devices, such as a first display 118, which may be a 4 k, 30 Hertz, 24-bit display or another kind of display, a second display 120, which may be a 4 k, 30 Hertz, 24-bit display or another kind of display, a camera 116, such as a webcam, a microphone 114, an audio device 112, such as headphones or speakers, and an external storage device 110, such as an external solid state drive. The dock 104 may further connect to the internet, to a local network, and/or to a power source. Peripheral devices connected to the dock 104 may include additional devices, such as keyboards, computer mice, trackpads, additional displays, additional webcams, additional microphones, additional audio devices, and additional storage devices. The information handling system 106 may be connected to the plurality of external devices 110-120 via the dock 104. For example, communications to and from the external devices 110-120 and the information handling system 102 may be transmitted via the dock 104 and via the wireless connection 108 between the information handling system and the dock 104.

Wireless connections, however, may encounter issues that may negatively impact a user experience. For example, the wireless connection 108 may have a limited bandwidth and may not be able to accommodate traffic from all of peripherals 110-120 and additional traffic such as communications between the information handling system 102 and the internet, simultaneously. Alternatively or additionally, the wireless connection 108 may introduce greater latency to a connection between the information handling system 102 and the peripheral devices 110-120 than would be introduced by a wired connection. Furthermore, the wireless connection 108 may be subjected to radio interference, which may further impact a quality of the wireless connection 108. Furthermore, the wireless connection 108 may require the information handling system 102 and dock 104 to consume more system resources in encoding data for wireless transmission, allocating wireless communications channels, controlling wireless communications power, governing MA-USB resilience, monitoring audio and video synchronization, and addressing other requirements for wireless communications. Thus, it may be advantageous to facilitate communication between the information handling system 102 and the dock 104, via both the wireless connection 108 and a wired connection 106, such as a USB-C connection. For example, the information handling system 102 may be physically connected to the dock 104 via a wired connection 106 in addition to being connected to the dock 104 via the wireless connection 108.

Traffic between the information handling system and the dock 104, and by extension the internet, peripheral devices 110-120, and additional peripheral devices may be allocated between the wired connection 106 and the wireless connection 108 based on characteristics of the data. For example, a first portion of data transmitted from the information handling system 102 to the dock 104 may be transmitted via the wireless connection 108, while a second portion of data transmitted from the information handling system 102 to the dock 104 may be transmitted via the wired connection 106. Likewise, a first portion data transmitted from the dock 104 to the information handling system 102 may be transmitted via the wireless connection 108, while a second portion of data transmitted from the dock 104 to the information handling system 102 may be transmitted via the wired connection 106. For example, if the information handling system 102 is connected to a keyboard and mouse via the dock 104, keyboard and mouse input data may be transmitted from the dock 104 to the information handling system 102 via the wired connection 106 to reduce a latency in communication of the data. Reduced latency in communication of input data, such as keyboard and mouse data, may enhance a user experience. Likewise, if the information handling system 102 is connected to two high resolution displays 118-120, such as two 4 k displays, via the dock 104, display data may be transmitted from the information handling system 102 to the dock 104, and by extension to the displays 118-120, via both the wired connection 106 and the wireless connection 108. For example, if the wired connection 106 has insufficient bandwidth to transmit data for both displays 118, 120 simultaneously, or if simultaneous transmission of both displays 118, 120 would negatively impact a frame rate of the displays, data for the first display 118 may be transmitted via the wired interface 106, while data for the second display 120 may be transmitted via the wireless interface 108.

Figure 2:
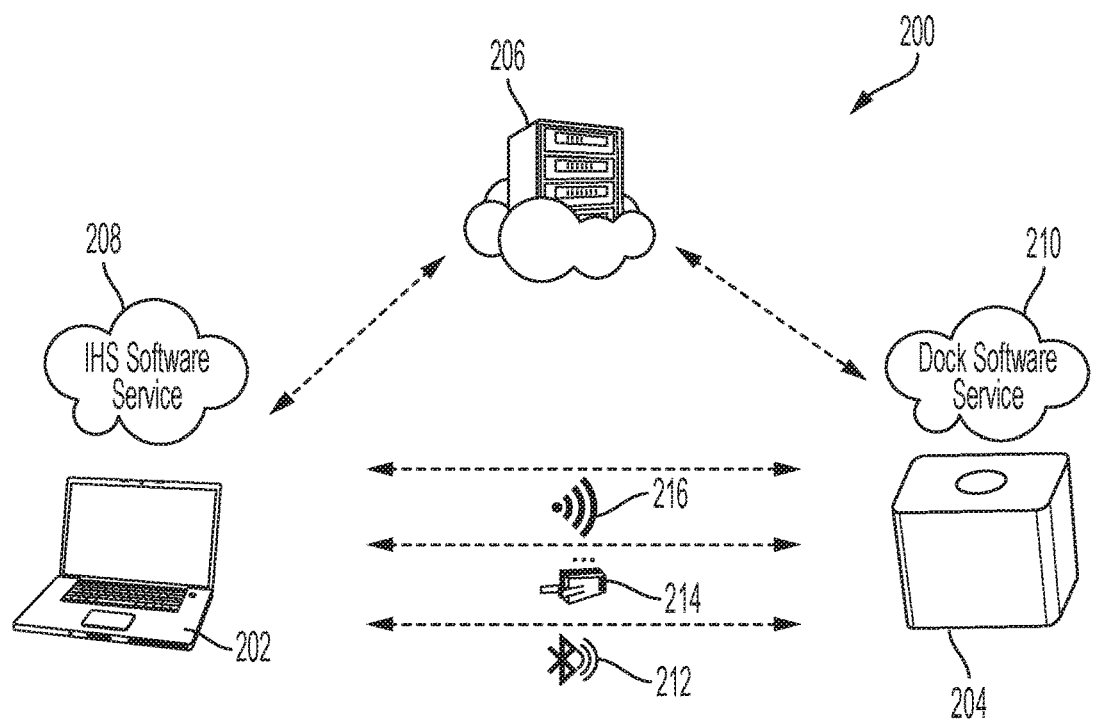
FIG. 2 is an illustration of an example network layout of an information handling system, a dock, and a cloud server according to some embodiments of the disclosure.

An example network 200 including an information handling system 202, a dock 204, and a cloud server 206, is shown in FIG. 2. The information handling system 202 may be a portable information handling system, such as a notebook computer. The information handling system 202 may be connected to and communicate with the dock 204 via a plurality of wired and wireless interfaces. For example, the information handling system 202 may be connected to the dock 204 via a wired USB-C interface 214, via a wireless Bluetooth interface 212, and via another wireless interface 216, such as a Wi-Fi interface. The information handling system 102 may communicate wirelessly with the dock 204 using a wireless communications protocol, such as RTP over UDP or MA-USB over TCP. Data transmitted between the information handling system 202 and the dock 204 may be transmitted via one or more of the interfaces 212-216. The information handling system 202 may execute a software service 208 to monitor data for transmission and to allocate data among the interfaces 212-216. Alternatively or additionally, the dock 204 may execute a software service 210 to monitor data for transmission and to allocate data among the interfaces 212-216. In some embodiments, the dock software service 210 and the information handling system software service 208 may communicate with each other to allocate the data among the interfaces 212-216. In some embodiments, the information handling system 202 and the dock 204 may communicate with a cloud server 206. For example, in some embodiments, the IHS software service 208 and/or the dock software service 210 may receive updates from the cloud server 206. For example, a rules engine residing in the cloud server 206 may push rules for allocation of data among the interfaces 212-216 to the information handling system 202 and/or the dock 204.

Figure 3:
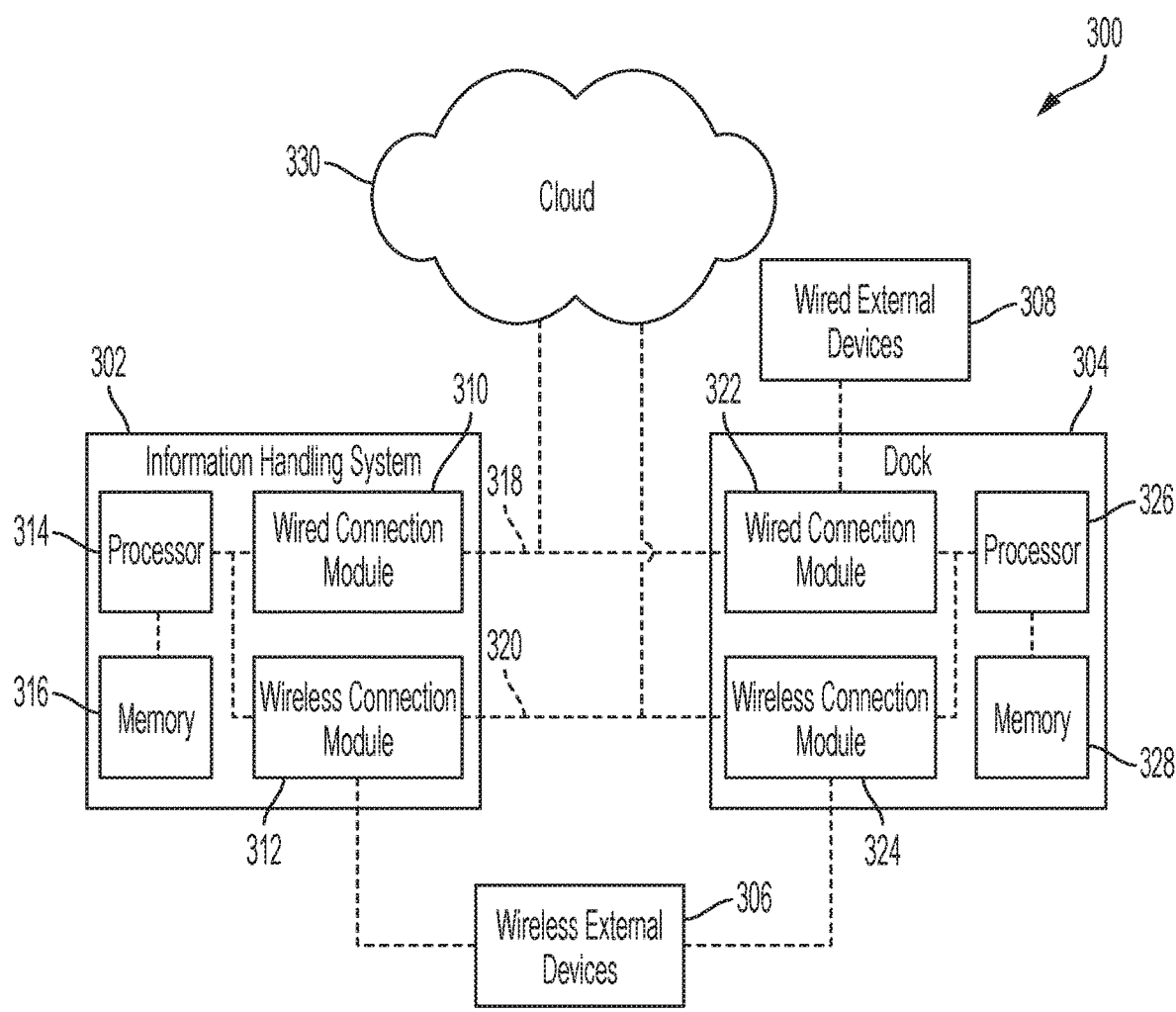
FIG. 3 is a block diagram of an example information handling system connected to a dock according to some embodiments of the disclosure.

An example block diagram 300 of an information handling system 302 in communication with a dock 304 is shown in FIG. 3. The information handling system 302 may include a memory 316. The memory 316 may store information for use by a processor 314, such as rules for allocation of data among interfaces connecting the information handling system 302 to the dock provided by a rules engine and instructions for an information handling system software service for monitoring and allocating data traffic between the information handling system 302 and the dock 304. The information handling system 302 may include a processor 314 coupled to the memory 316 for performing the steps described herein. The processor 314 may be in communication with and/or may control a plurality of interfaces of the information handling system 302. For example, the information handling system 302 may include a wired connection module 310 including one or more wired interfaces, such as a USB-C interface, a USB 2.0 interface, an Ethernet connection interface, or other wired interface. The information handling system 302 may also include a wireless connection module 312, which may include one or more wireless communication interfaces. For example, the wireless connection module 312 may include a Bluetooth interface and/or a Wi-Fi interface. In some embodiments, the wireless connection module 312 may be configured to communicate using an RTP over UDP communications protocol, and/or an MA-USB over TCP communications protocol.

The information handling system 302 may be connected to the dock 304 via both the wired interface 318 and the wireless interface 320. For example, the information handling system 302 may be connected to the dock 304 via both a Bluetooth connection and via a hard-wired USB-C connection. The wired connection module 310 of the information handling system 302 may be connected to a wired connection module 322 of the dock 304 via a wired interface 318. The wired connection module 322 of the dock 304 may include one or more wired interfaces, such as a USB-C interface, a USB 2.0 interface, an Ethernet connection interface, or other wired interface. The wireless connection module 320 of the information handling system 302 may be connected to a wireless connection module 324 of the dock 304 via the wireless interface 320. The wireless connection module 324 of the dock 304 may include one or more wireless interfaces, such as a Bluetooth interface and/or a Wi-Fi interface. For example, the wireless connection module 324 may be configured to communicate using an RTP over UDP communications protocol, and/or an MA-USB over TCP communications protocol. The dock 304 may also include a processor 326, which may communicate with and/or control the wired connection module 322 and the wireless connection module 324, and a memory 328 for storing instructions and data such as rules for allocation of data among interfaces provided by a rules engine and/or instructions for a dock software service for monitoring and allocating data traffic between the information handling system 302 and the dock 304 across the wired 318 and wireless 320 interfaces.

The information handling system 302 may connect to one or more wired external devices 308 and/or wireless external devices 306 through the dock 304. For example, the wired external devices 308 and wireless external devices 306 may include keyboards, mice, displays, speakers, cameras, storage devices, and other external devices that are connected via wired or wireless connections to the dock 304. The wired external devices 308 may communicate with the dock 304 via the wired connection module 322. Wireless external devices 306 may be connected directly to the information handling system 302 through the wireless connection module 312 of the information handling system 302 or to the information handling system 302 through the dock 304 via the wireless connection module 324 of the dock 304. When docked, the information handling system 302 may communicate with a plurality of wired external devices 308 and/or wireless external devices 306 via the dock 304. The information handling system may transmit data to the wired and wireless external devices 306, 308 via the dock 304 using one or more of the wired interface 318 and the wireless interface 320. Likewise the wired and wireless external devices 306, 308 may transmit data to the information handling system 302 via the dock 304 using one or both of the wired interface 318 and the wireless interface 320.

The information handling system 302 and/or the dock 304 may allocate data for communication across the wired interface 318 and the wireless interface 320. Data characteristics of data to be transmitted via the wired and wireless interfaces may be used as a basis for determining which interface(s) should be used for transmission of the data. Data characteristics may include a preferred latency of the data, an amount of the data, a type of the data, and other characteristics of the data. For example, data requiring a low latency, such as a latency below a latency threshold, may be transmitted via the wired interface 318 as the wired interface 318 may introduce less latency in transmission of the data than the wireless interface 320. Low latency in transmission of data from an input device such as a keyboard or a mouse may be desirable, particularly if the input data is being used to control gaming applications, and thus input data from a keyboard or mouse may be transmitted from the dock 304 to the information handling system 302 via the wired interface 318. If a greater bandwidth is required for transmission of data than is provided by a single one of the wired interface 318 and the wireless interface 320 alone, data transmission may be split across both the wired interface 318 and the wireless interface 320. For example, if two high resolution displays are connected to the information handling system 302 via the dock 304 and a high display refresh rate is desired, data for a first display may be transmitted via the wired interface 318, while data for a second display may be transmitted via the wireless interface 320. In some embodiments, an information handling system service may allocate data for transmission across the wired interface 318 and the wireless interface 320, both from the information handling system 302 to the dock 304 and from the dock 304 to the information handling system 302. In some embodiments a dock service may allocate data for transmission across the wired interface 318 and the wireless interface 320, both from the information handling system 302 to the dock 304 and from the dock 304 to the information handling system 302. In some embodiments, an information handling system service and a dock service may communicate with each other to allocate data for transmission across the wired interface 318 and the wireless interface 320. In some embodiments, all communications between the information handling system 302 and the dock 304 may be transmitted via the wired interface 318 when the information handling system 302 is connected to the dock 304 via both the wired interface 318 and the wireless interface 320. In some embodiments, all communications between the information handling system 302 and the dock 304 may be transmitted via the wireless interface 320 when the information handling system 302 is connected to the dock 304 via both the wired interface 318 and the wireless interface 320.

In some embodiments the information handling system 302 and/or the dock 304 may be connected to the cloud 330, such as to the internet or an external network, via at least one of the wired interface 318 and the wireless interface 320. In some embodiments, the information handling system 302 may connect to the cloud 330 via the dock 304 such as through the wireless interface 320 with the dock 304 and/or the wired interface 318 with the dock 304. Thus, data traffic to and from the cloud 330 may also be allocated between the wired interface 318 and the wireless interface 320 when communicated through the dock 304.

An information handling system service and a dock service may communicate to allocate data for transmission between a wireless interface and a wired interface. An example process flow diagram 400 is shown in FIG. 4. At step 410, an information handling system service 402, such as an information handling system data allocation service, may initialize. For example, the information handling system service 402 may initialize upon boot up of the information handling system or upon connection of the information handling system to the dock. At step 412, a dock service 404, such as a dock data allocation service, may initialize. For example, the dock service may initialize upon boot up of the dock or upon connection of the dock to the information handling system.

A rules engine 406 may be executed by the information handling system, the dock, both the information handling system and the dock, or a server on the cloud to provide rules for allocation of data across wired and wireless interfaces between the information handling system and the dock. At step 414, the rules engine 406 may provide device configuration rules. The rules may include, for example, rules specifying whether data with predetermined characteristics should be transmitted via wired interfaces or wireless interfaces. For example, rules may specify latency or bandwidth thresholds that may govern allocation of data between the wired interface and the wireless interface. In some embodiments the rules may specify specific configurations of data allocation between wired and wireless interfaces when predetermined combinations of data having specific data characteristics are transmitted. For example, for high rate gaming applications the rules engine 406 may specify that input data, such as keyboard and mouse data, should be transmitted via a wired interface, while high refresh rate display data, such as 4 k display data for multiple displays, should be divided across the wired interface and the wireless interface.

At step 416, the information handling system service 402 may receive the device configuration rules from the dock and may set the rules that apply to the information handling system. For example, the information handling system may set rules that govern allocation of data between the wired and wireless interfaces when data is transmitted from the information handling system to the dock. At step 418, the information handling system service 402 may transmit dock configuration rules to the dock service 404. For example, the rules received by the information handling system service 402 from the rules engine 406 may include one or more rules governing data allocation by the dock service 404, and the information handling system 402 may transmit such rules to the dock service 404. At step 420, the dock service may receive the rules from the information handling system and mays et the dock rules. In some embodiments, the dock service 404 may communicate directly with the rules engine 406, such that dock configuration rules are sent directly to the dock service 404 and information handling system configuration rules are sent directly to the information handling system service 402. Thus, the rules for allocating data for transmission across wired and wireless interfaces by an information handling system service 402 and a dock service 404 may be generated and transmitted by a rules engine 406.

At step 422, one or more applications 408 executed by the information handling system may initialize. The applications 408 may, for example, begin generating data for transmission between the information handling system and the dock. The applications 408 may transmit application data information to the information handling system service 402. At step 424, the information handling system service 402 may receive the application data information from the applications 408 and may allocate traffic between the wired and wireless interfaces. For example, the information handling system service 402 may monitor data generated by the applications 408 and may allocate data for transmission based on characteristics of the data generated by the applications 408 and the rules received from the rules engine 406. For example, traffic requiring a low latency may be allocated to a wired interface, while traffic not requiring low latency may be allocated to a wireless interface. In some embodiments, multiple characteristics of multiple data sets may be analyzed in determining a most efficient data allocation between the wired and wireless interfaces. At step 426, the information handling system service 426 may transmit application data information to the dock service 404. For example, the information handling system may transmit information about applications 408 being run by the information handling system and data being generated by the applications 408 to the dock service 404. At step 428, the dock service 404 may receive application data information from the information handling system service 402 and may allocate data traffic. For example, the dock service may allocate data to be transmitted from the dock to the information handling system across the wired and wireless interfaces. In some embodiments, the information handling system service 402 may control allocation of data in both directions and may instruct the dock service 404 of a data allocation to apply.

At step 430, the information handling system service 402 may transmit allocated forward channel data. Forward channel data may, for example, be data transmitted from the information handling system to the dock. The allocated forward channel data may be transmitted across both wired and wireless interfaces. In some embodiments, the forward channel data may be transmitted across only one of the wired and wireless interfaces. At step 432, the dock service 404 may receive the forward channel data. At step 436, the dock service 404 may transmit back channel data. Back channel data may, for example, be data transmitted from the dock to the information handling system, such as input data from one or more peripheral devices connected to the dock. The allocated back channel data may be transmitted across a wired interface, a wireless interface, or both wired and wireless interfaces. At step 434, the information handling system service 402 may receive the allocated back channel data.

In some embodiments, adjustments to transmission of data via the wired and wireless interfaces may be made by the information handling system service and/or the dock system service in response to detected changes in data characteristics. For example, if a determination is made that a bandwidth required for transmission of data that has been allocated to the wired interface has exceeded a maximum bandwidth of the wired interface or has exceeded a threshold that will impact a quality of service, the information handling system service may initialize a bandwidth pulse shaping function on the forward channel, such as on the wired interface, to accommodate the increased need for bandwidth. Alternatively, the information handling system service may transition at least part of the traffic allocated to the wired interface from the wired interface to the wireless interface, if the wireless interface has available bandwidth. If a determination is made that a required bandwidth for transmission of data allocated to the wireless interface exceeds an instantaneous wireless bandwidth capacity or exceeds a threshold that will impact a quality of service, the information handling system service may implement a higher compression ratio for forward channel data, such as forward channel graphics data, to reduce a bandwidth consumed by the forward channel data. Alternatively, the information handling system service may shift at least part of the data allocated to the wireless interface to the wired interface, if the wired interface has additional bandwidth available for transmission of data. In some embodiments, the information handling system service may also instruct the dock as to adjustments in back channel data transmission and allocation, such as to reduce back channel traffic bandwidth, to improve quality of service on the wired and wireless interfaces, or to adjust transmission of data based on round trip latency considerations. In other embodiments, the dock system service may independently monitor and adjust back channel data transmission properties and allocation between the wired and wireless interfaces similarly to the adjustments described above with respect to the information handling system service. The dock system service may also instruct the information handling system service of changes made to allocation and/or transmission of back channel data and may, in some embodiments, instruct the information handling system service of changes that should be made to allocation and/or transmission of forward channel data. Adjustments to data transmission allocation between the wired and wireless interfaces may be performed in accordance with the process flow diagram 450 of FIG. 4B.

Figure 4A:
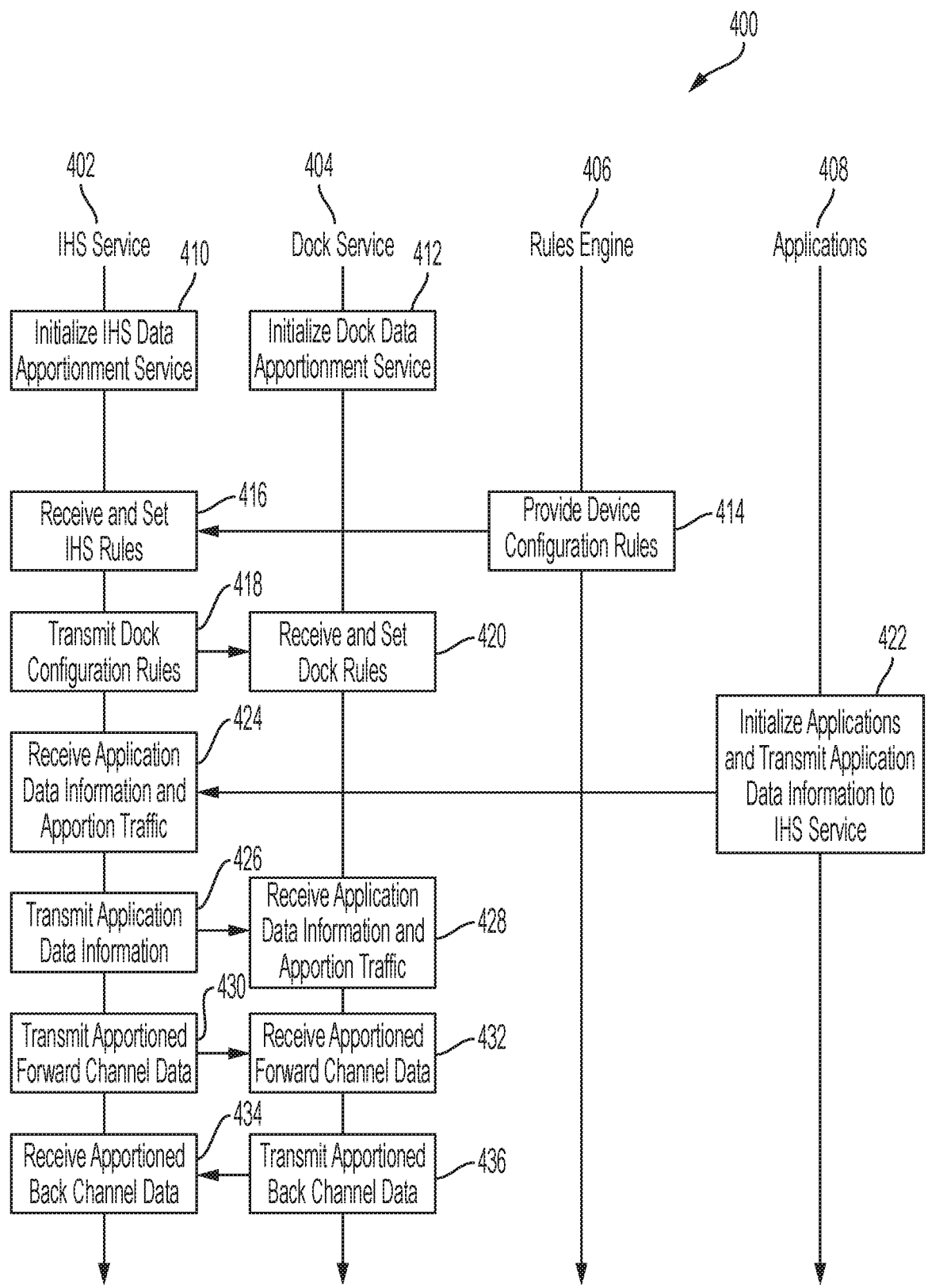
FIG. 4A is an example process flow diagram of data allocation between wired and wireless interfaces according to some embodiments of the disclosure.
Figure 4B:
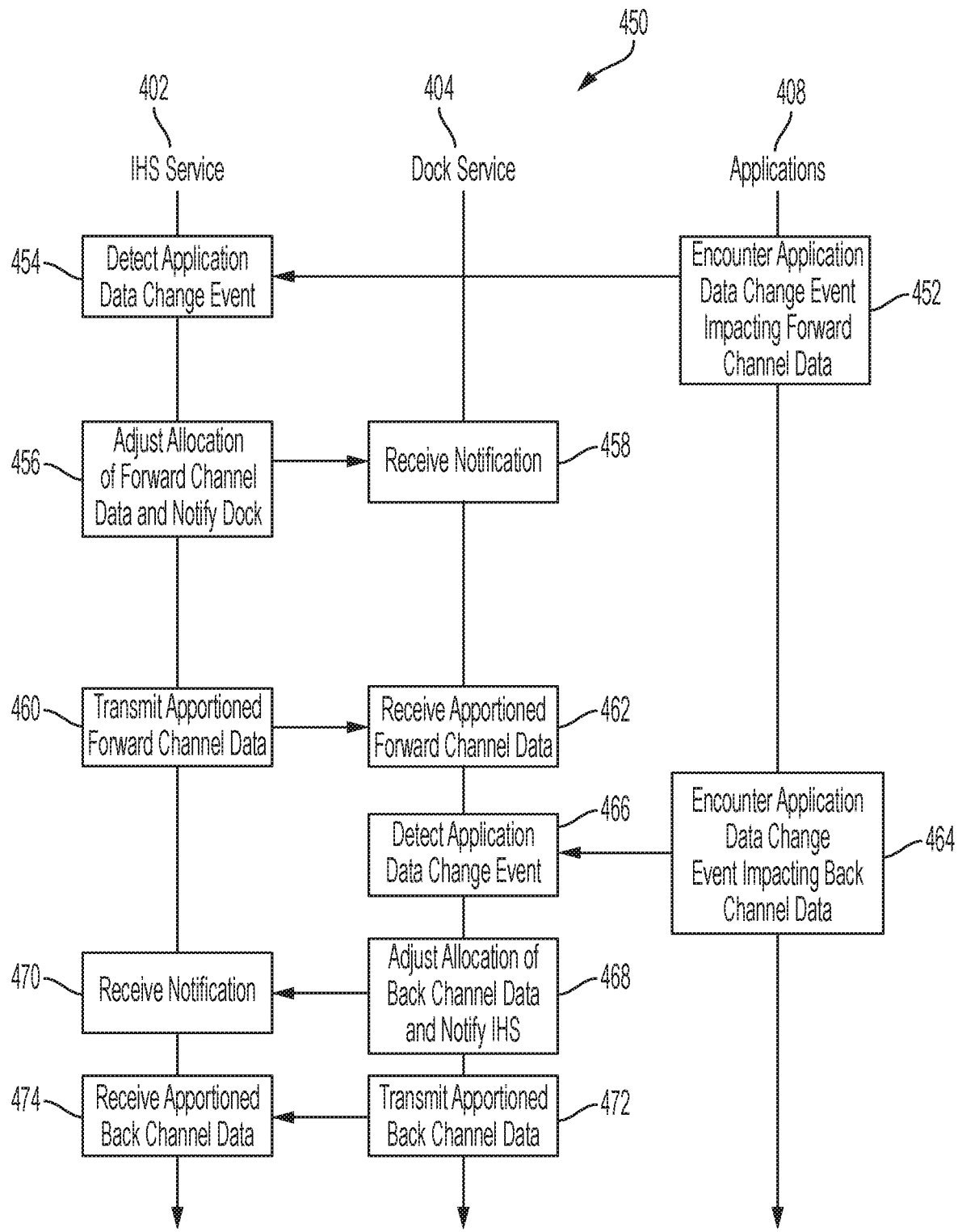
FIG. 4B is an example process flow diagram of adjustment of data allocation between wired and wireless interfaces according to some embodiments of the disclosure.

The information handling system service 402 and/or dock service 404 may monitor data characteristics over time and may adjust allocation of data between wired and wireless interfaces based on changes in data characteristics, as shown in process flow diagram 450 of FIG. 4B. At step 452, an application data change event may be encountered by one or more applications 408 that impacts forward channel data. For example, one or more characteristics of forward channel data generated or received by applications 408 may change. As one example, a user may transition from a gaming application, requiring low latency input and display data, to word processing. As another example, a bandwidth required to transmit data via a wired or wireless interface between the information handling system and the dock may exceed a predetermined threshold, such as a maximum bandwidth or a threshold set to maintain a quality of service.

At step 454, the information handling system service may detect the application data change event 454. For example, the information handling system service 402 may monitor applications 408 executed by the information handling system and or data generated by the applications 408 and may detect when characteristics of the data change. For example, a required bandwidth or latency for transmission of the data may change. At step 456, the information handling system may adjust allocation of the forward channel data and may notify the dock system service 404 of the adjustment. For example, when the information handling system service 402 detects that a required bandwidth for transmission of data has decreased, such as when a user transitioned from using two external displays at a high resolution to a single external display at a low resolution the allocation of the data between the interfaces may be adjusted. For example, the display data may be adjusted from transmission across both wired and wireless interfaces to transmission across a single interface. Alternatively, if the information handling system service 402 detects a disconnection of the wired interface or interference on the wireless interface that exceeds a threshold interference, the information handling system service 402 may transition traffic to the other of the two interfaces. As another example, if a bandwidth for transmission of the data via the wired interface exceeds a bandwidth threshold of the wired interface the information handling system service 402 may initialize a bandwidth shaping process for transmission of the data via the wired interface or shift at least part of the data to be transmitted via the wireless interface. As another example, if a bandwidth for transmission of the data via the wireless interface exceeds a bandwidth threshold of the wireless interface, the information handling system service 402 may apply compression to data to be transmitted via the wireless interface and/or shift part of the data to transmission via the wired interface.

At step 458, the dock service 404 may receive the notification of the adjusted allocation. At step 460, the information handling system service 402 may transmit the forward channel data with the adjusted allocation. At step 462, the dock service 404 may receive the allocated forward channel data.

At step 464, the applications 408 may encounter an application data change event that impacts back channel data. For example, one or more characteristics of data to be transmitted from the dock to the information handling system may change. At step 466, the dock service 404 may detect the application data change event. For example, the dock service 404 may monitor applications executed by the information handling system and/or data generated and/or requested by applications executed by the information handling system to detect changes in characteristics of data to be transmitted between the dock and the information handling system. For example, a user may start up a gaming application that would benefit from low latency input transmission, such as transmission of input data from a computer mouse or keyboard, to the information handling system. For example, a bandwidth for transmission of the data via either a wired or wireless interface of the back channel may exceed a threshold bandwidth, such as a maximum bandwidth of the wired or wireless interface or a bandwidth threshold set to maintain a quality of service for transmission of back channel data. As another example, a latency of transmission of the back channel data via the wired or wireless interface may exceed a threshold latency. In some embodiments, the information handling system service 402 may detect the application data change event impacting the back channel data and may notify the dock service 404. In some embodiments, the information handling system service 402 may instruct the dock service 404 as to adjustments to make in allocating data based on the detected application data change event.

At step 468, the dock service 404 may adjust allocation of back channel data based on the detected change in application data and may notify the information handling system service 402 of the adjusted allocation. For example, if a bandwidth for transmission of the data via the wired interface exceeds a threshold bandwidth for the wired interface, the dock service 404 may allocate part or all of the data for transmission via the wireless interface. As another example, if a bandwidth for transmission of the data via the wireless interface exceeds a threshold bandwidth for the wireless interface and/or a latency of transmission of the data via the wireless interface exceeds a threshold latency, the dock service 404 may allocate part or all of the data for transmission via the wired interface instead of the wireless interface. At step 470, the information handling system service 402 may receive the notification that an allocation of back channel data between the wired and wireless interface has been adjusted. At step 472, the dock service 404 may transmit allocated back channel data via at least one of the wired interface and the wireless interface to the information handling system. At step 474, the information handling system service 402 may receive the allocated back channel data. Thus, an allocation of data to be transmitted between an information handling system and a dock may be adjusted based on changes in one or more characteristics of data to be transmitted.

Figure 5:
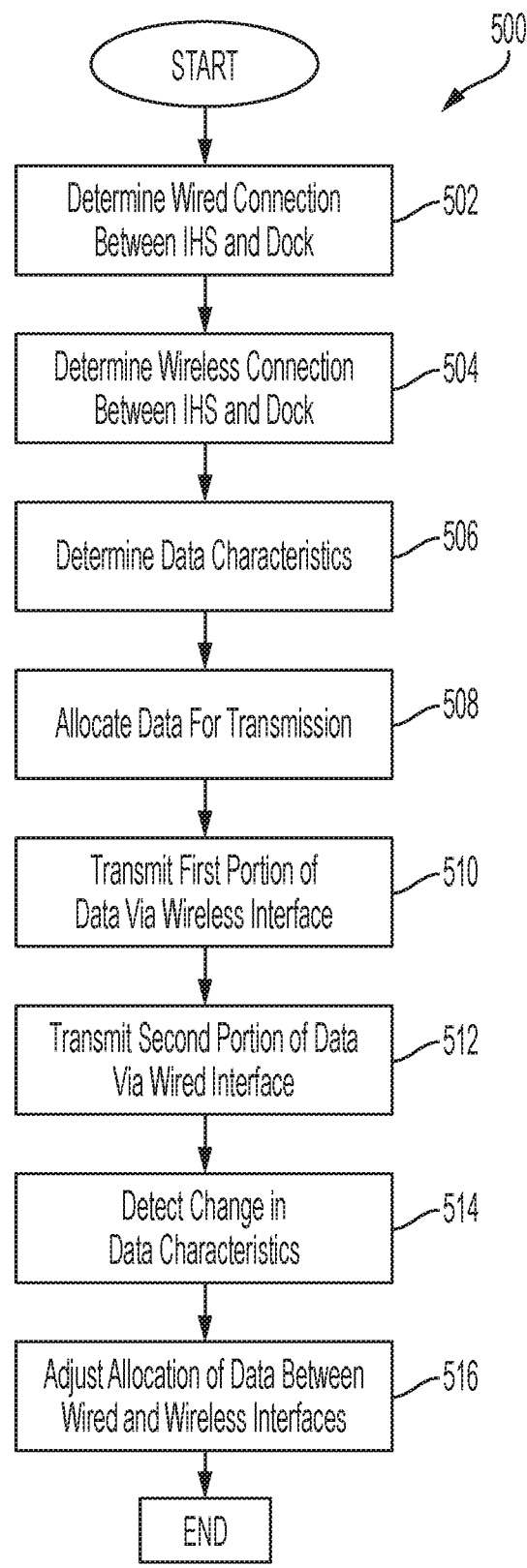
FIG. 5 is a flow chart of an example method for allocating data between a wired interface and a wireless interface of an information handling system and a dock according to some embodiments of the disclosure.

Data for transmission between an information handling system and a dock may be allocated based on characteristics of the data. An example method 500 for allocation of data is shown in FIG. 5. The method 500 may begin at step 502 with determination of a wired connection between an information handling system and a dock. For example, an information handling system and/or a dock may detect that a wired connection has been established between the information handling system and the dock. In some embodiments, a system service executed by the information handling system and/or a system service executed by the dock may detect a wired connection between the information handling system and the dock. The wired connection may, for example, be a USB connection, such as a USB-C connection, or an Ethernet connection.

At step 502, a wireless connection between the information handling system and the dock may be determined. For example, an information handling system and/or a dock may detect that a wireless connection has been established between the information handling system and the dock. In some embodiments, a system service executed by the information handling system and/or a system service executed by the dock may detect a wireless connection between the information handling system and the dock. The wireless connection may, for example, be a Bluetooth connection, a Wi-Fi connection, a TCP over UDP connection, a MA-USB over TCP wireless connection, or other wireless connection.

At step 506, data characteristics of data to be transmitted between the information handling system and the dock may be determined. For example, the information handling system and/or dock may monitor applications executed by the information handling system to determine characteristics of data to be transmitted. Alternatively or additionally, the information handling system and/or dock may monitor and/or analyze data generated by applications to be transmitted between the information handling system and the dock. Data characteristics may, for example, include applications with which the data is associated, a type of the data, such as low refresh video data, high refresh video data, input data, information storage data, audio data, and other data types, a source or destination of the data, such as a peripheral device generating or receiving the data, a bandwidth of data to be transmitted, a loss tolerance of the transmission, such as lossy or lossless transmission, and other data characteristics.

Based on the data characteristics, data may be allocated, at step 508, for transmission between a wired interface and a wireless interface. For example, a system service executed by the information handling system and/or a system service executed by the dock may allocate data to be transmitted via the wired and wireless interfaces. For example, if a bandwidth of data to be transmitted exceeds a threshold, such as a maximum bandwidth of either the wired interface or the wireless interface, a portion of the data may be allocated for transmission across a wired interface while a different portion of the data may be allocated for transmission across the wireless interface. Alternatively, if a portion of the data requires a low latency or a low refresh rate, such as display or input data for a gaming application, the data may be allocated to the wired interface. In some embodiments, the information handling system service may allocate both forward and back channel data and may instruct the dock service as to allocation of the back channel data. In other embodiments the information handling system service may allocate the forward channel data while the dock service may allocate the back channel data. In other embodiments, the dock service may allocate both forward and back channel data and may instruct the information handling system service as to the allocation of the data. Allocation of the data between the wired and wireless interface may include allocating part or all of the forward channel data for transmission via the wired interface, allocating part or all of the forward channel data for transmission via the wireless interface, allocating part or all of the back channel data for transmission via the wired interface, and/or allocating part or all of the back channel data for transmission via the wireless interface. In some embodiments, the information handling system service may select an allocation mode and may inform the dock system service of the allocation mode. In some embodiments, data transmitted via the wireless interface may be time-multiplexed among multiple wireless connections, such between a Bluetooth connection and a Wi-Fi connection.

In an example scenario, data characteristics may indicate that an information handling system is communicating with two 4 k displays, a keyboard, and a mouse via the dock. A high bandwidth may be desirable for forward channel data being transmitted from the information handling system to the two 4 k displays. In particular, a high bandwidth for the display data may be desirable when displaying high motion content, such as gaming content, to maintain a frames per second and/or refresh rate of the displays. A high bandwidth for the display data may avoid tearing and/or jaggy movement that can result from low frames per second. Low latency may be desirable for back channel keyboard and mouse data, particularly when used for gaming applications. Low latency may also be desirable for display refresh forward channel data. Rules received by the information handling system process and/or the dock system process may specify how data should be apportioned between the wired and wireless interfaces based on such concerns. For example, when a high refresh rate and/or bandwidth is desirable for display data, such as when using multiple high resolution displays for a gaming application, data for a first display may be transmitted over the wired interface, such as a USB-C interface, and data for a second display may be transmitted over a wireless interface, such as a Wi-Fi or Bluetooth interface using an RTP over UDP communications protocol. In some embodiments, more than two displays may be coupled to the information handling system via the dock, and data for two or more displays may be transmitted via the wireless interface while data for two or more displays may be transmitted via the wired interface. Alternatively, if a high bandwidth is not required, such as for low refresh rate applications such as word processing or web browsing, all display data may be transmitted over the wired interface. On the back channel, keyboard and mouse data may be transmitted from the dock to the information handling system via the wired interface, such as the USB-C interface, to maintain a low latency, as input data from a keyboard and mouse may not require a high bandwidth.

If a user begins to use a microphone or a camera connected to the dock for live-streaming video or audio content, in addition to using two high resolution displays for a gaming application, the back channel transmission of data from the dock to the information handling system may be adjusted to accommodate the streaming video and audio data. For example, it may be desirable for streaming of video and audio data to be unaffected by interference. Thus, the video and/or audio data may be transmitted via the wired interface, in addition to the keyboard and mouse input data, to guarantee transmission to the information handling system. For example, the keyboard, mouse, video, and/or audio data may be transmitted simultaneously via the wired interface in an isochronous mode.

If a user begins to use an external storage device, such as external solid state drive connected to the dock, to transfer files from the storage to the information handling system from the dock, in addition to use of two high resolution displays, a keyboard, a mouse, a webcam, and a microphone, the back channel transmission of data from the dock to the information handling system may be further adjusted. For example, data characteristics of the file transfer data from the external solid state drive to the dock may indicate a high latency tolerance for the data transfer. One or more rules from the rules engine may specify that such data may be transmitted via the wireless interface, given the tolerance for high latency. Thus, the keyboard, mouse, webcam, and audio data may be transmitted from the dock to the information handling system via the wired interface, while files being transferred from the dock to the information handling system may be transferred via the wireless interface, such as via a MA-USB over TCP interface, such as a Bluetooth or Wi-Fi connection.

In some embodiments, allocation of data between a wired and wireless interface may be controlled by a user. For example, a user may select a system configuration option that selects a predetermined set of rules for governing allocation of data between the wired and wireless interface. Alternatively or additionally, the user may be able to generate individual rules for governing allocation of data between the wired and wireless interfaces depending on the user's needs. For example, a user may set a primary communication channel as either a wired connection, such as a USB-C connection, or a wireless connection, such as a Bluetooth or Wi-Fi connection between the information handling system and the dock. Alternatively or additionally, the user may be able to configure specific patterns for data transmission via the wired and wireless interfaces. For example, the user may assign forward channel communications to be transmitted via a wired connection and back channel communications to be transmitted via a wireless connection.

At step 510, a first portion of the data may be transmitted via the wireless interface. For example, part or all of the forward channel data may be transmitted via the wireless interface. Alternatively or additionally, part or all of the back channel data may be transmitted via the wireless interface.

At step 512, a second portion of the data may be transmitted via the wired interface. For example, part or all of the forward channel data may be transmitted via the wired interface. Alternatively or additionally, part or all of the back channel data may be transmitted via the wired interface. Thus, the information handling system and/or dock may flexibly allocate data transmission between the information handling system and the dock between the wired interface and the wireless interface.

At step 514, a change may be detected in one or more data characteristics. For example, an information handling system service and/or a dock system service may detect that a new application is being executed by the information handling system and is generating new data or that an application previously executed by the information handling system has been terminated. Alternatively, the information handling system and/or the dock may detect that an overall required bandwidth for the information handling system and the dock has increased or decreased. As another example, the information handling system and/or the dock may detect that a new peripheral device is in use by the information handling system or that a peripheral device that was previously in use has ceased to be used. As another example, the information handling system and/or dock may detect that display of a gaming application requiring low latency in transmission of display data has been moved from a first display to a second display.

Based on the detected changes in data characteristics, the allocation of data between the wired and wireless interfaces for transmission between the information handling system and the dock may be adjusted, at step 516. For example, if a required bandwidth for transmission of the data falls below a threshold the data for transmission may be transitioned from transmission via both wired and wireless interfaces to transmission via a single interface. For example, an information handling system may be connected to first and second 4k displays, a mouse, and a keyboard via a dock and may initially communicate with the dock exclusively via a wireless interface. The information handling system service may detect one or more changes in data characteristics, such as an increase in data latency for one or more types of data that exceeds a data latency threshold. Alternatively, the information handling system service may detect that an information handling system that was not connected via a wired connection has been connected via a wired connection. For example, a user may experience latency when operating exclusively via the wireless connection with the dock and may manually establish a wired connection between the information handling system and the dock. When the change in data characteristics is detected, such as an increase in latency above a threshold or establishment of a wired connection, the information handling system may adjust allocation of data across the wired and wireless interfaces. For example, the information handling system service may shift transmission of display data for one of the displays from the wireless interface to the wired interface and may maintain transmission of display data for the other of the two displays via the wireless interface. If a high refresh rate is not necessary for both displays, display data for both of the displays may be shifted to transmission via the wired interface. Input data from the keyboard and the mouse may also be shifted from the wireless interface to the wired interface. In some embodiments, the dock may also adjust allocation of data between wired and wireless interfaces based on detected changes in data characteristics. As another example, if display of a gaming application requiring low latency has been shifted from a first display to a second display, transmission of the display data for the first display, which is no longer displaying the gaming application, may be allocated to the wireless interface, while transmission of the display data for the second display, which is now displaying the gaming application, may be allocated to the wired interface. Thus, the information handling system and/or the dock may dynamically adjust allocation of data between the wired and wireless interfaces based on detected changes in data characteristics.

The process flow diagrams of FIGS. 4A-B and the flow chart diagram of FIG. 5 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for allocating traffic between a wireless connection and a wired connection between an information handling system and a dock, the method comprising:
    determining that the information handling system is connected to the dock via both the wireless connection and the wired connection;
    when the information handling system is determined to be connected to the dock via both the wireless connection and the wired connection:
        determining one or more characteristics of at least a portion of data to be transmitted between the information handling system and the dock;
        allocating a first portion of the data and a second portion of the data based, at least in part, on a bandwidth threshold for the wired connection or the wireless connection or both and based on the one or more characteristics;
        transmitting the first portion of the data via the wireless connection based, at least in part, on at least one threshold for the one or more characteristics;
        transmitting the second portion of the data via the wired connection based, at least in part, on the at least one threshold for the one or more characteristics; and
        adjusting an allocation of the data to be transmitted between the wireless connection and the wired connection based, at least in part, on a change in the one or more characteristics.

2. The method of claim 1, wherein the data to be transmitted comprises forward channel data, further comprising:
    allocating, by the information handling system, a first portion of the forward channel data to be transmitted via the wireless connection based, at least in part, on the one or more characteristics; and
    allocating, by the information handling system, a second portion of the forward channel data to be transmitted via the wireless connection based, at least in part, on the one or more characteristics,
    wherein the first portion of the data comprises the first portion of the forward channel data, and
    wherein the second portion of the data comprises the second portion of the forward channel data.

3. The method of claim 1, wherein the data to be transmitted comprises hack channel data, further comprising:
    allocating, by the dock, a first portion of the back channel data to be transmitted via the wireless connection based, at least in part, on the one or more characteristics; and
    allocating, by the dock, a second portion of the forward channel data to be transmitted via the wireless connection based, at least in part, on the one or more characteristics,
    wherein the first portion of the data comprises the first portion of the back channel data, and
    wherein the second portion of the data comprises the second portion of the back channel data.

4. The method of claim 1, further comprising:
    receiving, by the information handling system, the first portion of the data from the dock; and
    receiving, by the information handling system, the second portion of the data from the dock,
    wherein the first portion of the data comprises data allocated, by the dock, for transmission via the wireless connection, and
    wherein the second portion of the data comprises data allocated, by the dock, for transmission via the wired connection.

5. The method of claim 1, wherein the wired connection is a universal serial bus type-C; (USB-C) connection.

6. The method of claim 1, wherein the one or more characteristics of at least a portion of the data comprise a desired latency of at least a portion of the data.

7. An information handling system, comprising:
    a wired interface for communicating over a wired connection;
    a wireless interface for communicating over a wireless connection; and
    a processor, wherein the processor is configured to perform steps comprising:
        determining that the information handling system is connected to a dock via both the wireless interface and the wired interface;

when the information handling system is determined to be connected to the dock via both the wireless interface and the wired interface:
  determining one or more characteristics of at least a portion of data to be communicated between the information handling system and the dock;
  allocating the data to be communicated between the information handling system and the dock between the wired interface and the wireless interface based, at least in part, on the one or more determined characteristics,
  transmitting the first portion of the data via the wireless connection based, at least in part, on at least one threshold for the one or more characteristics;
  transmitting the second portion of the data via the wired connection based, at least in part, on the at least one threshold for the one or more characteristics; and
  adjusting an allocation of the data to be transmitted between the wireless connection and the wired connection based, at least in part, on a change in the one or more characteristics.

8. The information handling system of claim 7, wherein the data comprises data for a plurality of displays connected to the dock, wherein transmitting the first portion of the data via the wireless interface comprises transmitting display data for a first display of the plurality of displays via the wireless interface, and wherein transmitting the second portion of the data via the wired interface comprises transmitting display data for a second display of the plurality of displays via the wired interface.

9. The information handling system of claim 7, wherein the wired interface is a universal serial bus type-C (USB-C) interface.

10. The information handling system of claim 7, wherein the one or more characteristics of at least a portion of the data comprise a desired latency of at least a portion of the data.

11. The information handling system of claim 7, wherein transmitting data over the wireless interface comprises transmitting data according to a real-time transport protocol (RTP) over user datagram protocol (UDP).

12. A dock for an information handling system, the dock comprising:
  a wired interface for communicating over a wired connection;
  a wireless interface for communicating over a wireless connection; and
  a processor, wherein the processor is configured to perform steps comprising:
    determining that the dock is connected to an information handling system via the wireless interface and the wired interface;
    when the information handling system is determined to be connected to the dock via both the wireless interface and the wired interface:
      determining one or more characteristics of at least a portion of data to be communicated between the dock and the information handling system; and
      allocating the data to be communicated between the dock and the information handling system between the wired interface and the wireless interface based, at least in part, on the one or more determined characteristics,
      transmitting the first portion of the data via the wireless connection based, at least in part, on at least one threshold for the one or more characteristics;
      transmitting the second portion of the data via the wired connection based, at least in part, on the at least one threshold for the one or more characteristics; and
      adjusting an allocation of the data to be transmitted between the wireless connection and the wired connection based, at least in part, on a change in the one or more characteristics.

13. The dock of claim 12, wherein the first portion of the data comprises file data from an external storage device connected to the dock, and wherein the second portion of the data comprises user input data from a user input device connected to the dock.

14. The dock of claim 12, wherein the wired interface is a universal serial bus type-C (USB-C) interface.

15. The dock of claim 12, wherein the one or more characteristics of at least a portion of the data comprise a desired latency of at least a portion of the data.

* * * * *